United States Patent

Everett

[15] 3,695,553

[45] Oct. 3, 1972

[54] CASSETTE TAPE ASSEMBLY

[72] Inventor: Thomas David Everett, Lombard, Ill.

[73] Assignee: Ampex Corporation, Redwood City, Calif.

[22] Filed: Aug. 24, 1970

[21] Appl. No.: 66,402

[52] U.S. Cl. .................242/199, 242/210, 274/41.4, 352/235, 352/237

[51] Int. Cl. ..........................G11b 5/72, G11b 23/10

[58] Field of Search......242/199, 200, 198, 197, 188, 242/210, 201, 74, 74.1, 74.2; 274/4 C, 4 B, 11 B, 11 C, 41.4; 352/72, 78, 235, 237, 238; 179/106.22

[56] References Cited

UNITED STATES PATENTS

| | | | |
|---|---|---|---|
| 3,572,606 | 3/1971 | Yamamoto | 242/57 |
| 2,898,805 | 8/1959 | Solow et al. | 352/235 |
| 3,476,469 | 11/1969 | Wells | 352/235 X |
| 3,526,406 | 9/1970 | Blackie et al. | 274/41.4 X |
| 3,217,996 | 11/1965 | Bernier | 242/188 |

*Primary Examiner*—George F. Mautz
*Attorney*—Anderson, Luedeka, Fitch, Even and Tabin and Robert G. Clay

[57] ABSTRACT

By adhering a reinforcing strip to each end of a magnetic tape and attaching these reinforced tape ends to supply and take-up reels in a cassette housing, the use of special leaders and the splicing thereof to the tape ends has been eliminated. The reinforced tape ends are of sufficient length to extend from its associated reel, when emptied, across the front of the cassette housing to a capstan receiving opening to reinforce the tape against breakage due to wear by the capstan and preferably to and about the outer convolution of tape on the other reel to aid in withstanding tensile forces.

2 Claims, 3 Drawing Figures

Inventor
Thomas David Everett
Anderson, Luedeka, Fitch, Even & Tabin
Attys.

CASSETTE TAPE ASSEMBLY

This invention relates to tape cassettes in which a magnetic tape is transported between and has opposite ends attached to a supply reel and a take-up reel; and also to a method of attaching these ends of the magnetic tape to the reels of the cassette.

The term "cassette" as used herein refers to a tape cartridge of a well known and mass produced type in which a magnetic tape is carried on two reels spaced apart and enclosed in a flat, thin plastic container. Each end of the tape is fastened or otherwise anchored by a leader to one of the reels and the tape is provided with mono or stereo tracks for replaying or recording sounds in both directions of tape transport within the cassette. The tape is usually fed back and forth, that is, from reel to reel for recording and playback within a suitable machine until such time as one reel is emptied and the other is full. Typically, each reel is driven by a spindle inserted into a hub at the center thereof and a tape capstan and pinch roller drive the tape at a predetermined constant speed during playback or recording operations. When the tape has been fully transferred onto one reel leaving the other one of the reels empty, the empty reel is initially held against rotation by the tape leader spanning the reels and resisting rotation of the empty reel. In some playback and recording machines, the stopping of tape transport at the time of emptying of one reel is detected by a sensing device and then the tape is either reversed in its direction of transport or the tape transport mechanism is disabled. In other machines, the stopping of the tape transport is not automatically sensed. In either event, during the interim between emptying of the reel and initiation of another operation, the tape capstan continues to rotate and rubs on the stationary leader thereby causing wear particularly when iron oxide is present. The leaders are usually considerably thicker and stronger than the very thin magnetic tape to withstand the tensile forces exerted during stopping and to withstand wear caused by the capstan rubbing on the stationary leader. The leaders are fastened at one end by a short strip of splicing tape to the magnetic tape and are fastened mechanically at the other end thereof to the reel.

As cassettes of this type are made in very large quantities for retail sale on the consumer market, the manufacturing process of attaching the leader to the reel and splicing to the magnetic tape involves several operations and different materials which must be inventoried, supplied and interrelated and which add to the cassette's cost.

Accordingly, an object of the present invention is to provide an improved method, as contrasted to the above described method, of attaching the magnetic tape to the reels of a tape cassette and also to a tape cassette assembly having such attachment between the magnetic tape and reels.

Other objects and advantages of the invention will become apparent from the detailed description taken in connection with the accompanying drawings in which.

Figure 1:
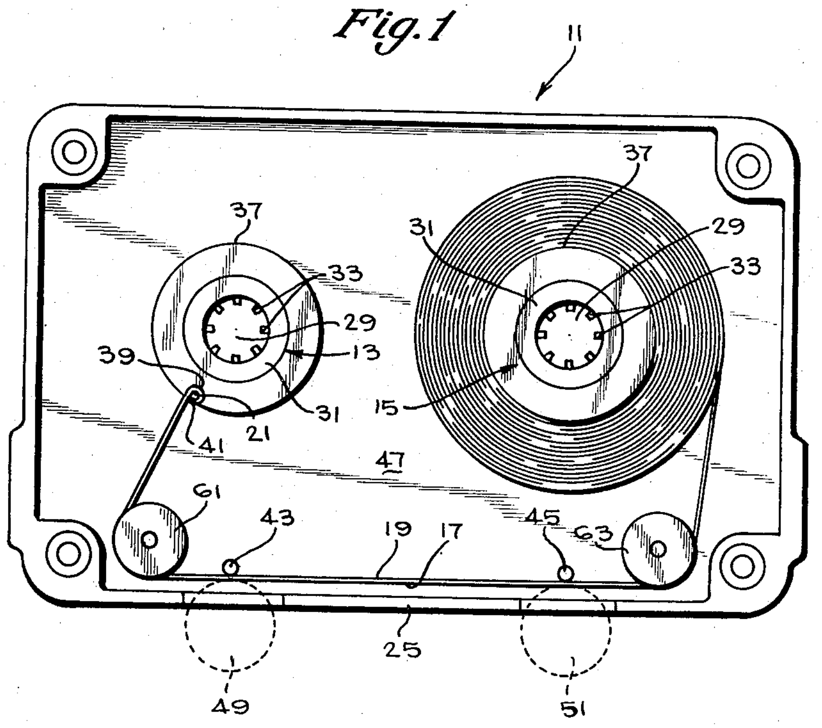
FIG. 1 is a view of a tape cassette with a top cover removed to illustrate the tape cassette reels and the attached ends of the magnetic tape.
Figure 2:
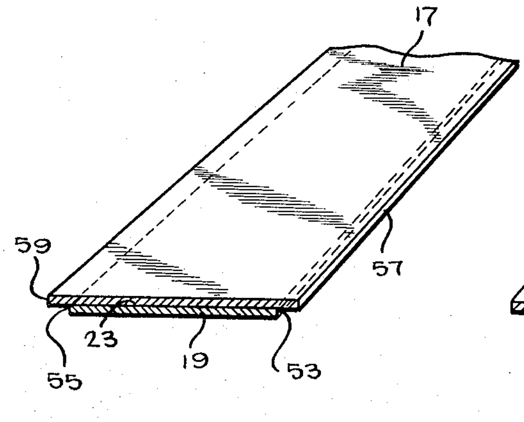
FIG. 2 is an enlarged partially sectional view of a reinforcing strip affixed to the magnetic tape for connection to the reel.

As shown in the drawings for purposes of illustration, the invention is embodied in a magnetic tape cassette 11 having a supply reel 13 and a take-up reel 15 with a magnetic tape 17 extending between the reels. The tape is transported in either direction with unwinding from one reel and winding on the other reel during playback or recording operations. One end of the tape is fastened to the supply reel 13 in a suitable manner, as illustrated in FIG. 1, and the other end of the tape is fastened to the take-up reel 15 in an identical manner. The ends of the magnetic tape have heretofore been spliced by splicing tapes to special leader (not shown) which, in turn, were attached to the supply and take-up reels. The leaders were of sufficient length to extend from one reel across the front of the cassette to and about the outer convolution of a coil of tape on the other reel when the one tape reel was empty. These leaders were considerably thicker in cross section than the cross section of the thin magnetic tape to resist tensile forces encountered at the initial stopping of the emptied reel and to resist rubbing of a capstan on the leader until the tape transport mechanism was disabled.

In accordance with the present invention, the necessity for having a special leader and the attaching thereof to the magnetic tape by a splicing tape have been eliminated by a process in which a reinforcing strip 19 is bonded directly to and along one side of the magnetic tape with the end of the magnetic tape being directly attached to the reel as by a mechanical anchor pin 21. More specifically, each reinforcing strip 19 is bonded, for example, by an adhesive coating 23 to one side of the magnetic tape and each reinforcing strip extends from anchoring pin 21 on its associated reel and along the magnetic tape for a distance sufficient to, when its associated reel is empty, to span across a front wall 25 of the cassette to and about the outer convolution of the coil of tape on the other reel. The adhesive coatings 23 preferably include a pressure sensitive adhesive which may be adhered to the magnetic tape with a feeding of the reinforcing strip 19 and a leading end of the magnetic tape 17 through a nip of a pair of rotatable pressure rolls (not shown).

Referring now more specifically to the cassette 11 shown in FIG. 1, each of the supply and take-up reels 13 and 15 is made of molded plastic with a central opening 29 in a hub 31 having angularly spaced inwardly projecting lugs 33 which engage in driving relation spindles of a player/recorder (not shown) inserted through the openings 29 to turn the reels during take-up or supply operations. The reels are generally annular in shape and are formed with an outer circumferential wall 37 about which the tape will be wound. The end of the reinforced tape may be secured in a number of manners to the reel. One such manner includes a pin and slot connection in which the anchoring pin 21 is projected into a circular opening 39 which is connected by a narrow throat 41 to the circumferential reel wall 37. The end of the reinforcing strip 19 and tape 17 extend from the circumferential reel wall 37 through the threat 41 into the opening 39 to encompass the anchoring pin 21. The latter is, at the time assembly, inserted in a directional parallel to the axis of reel rotation into the opening and is wedged by a force fit into the opening 39, thereby mechanically interlocking the reinforced tape end sandwiched between the groove wall 39 and the pin 21. The preferred anchoring pin 21 is a small cylindrical plastic rod which may be severed from a long length of plastic rod and inserted into the opening 39 by automatically operated equipment.

When the cassette 11 is in position for recording or playback, small cylindrical capstans (not shown) project through the openings 43 and 45 in bottom housing wall 47 and one or the other of two pressure or pinch rolls 49 or 51, shown in dotted lines in FIG. 1, is positioned to establish with its opposite capstan 43 or 45 a nip for causing the tape 17 to transport while the spindles (not shown) are inserted into the reels and also turn the reels to assist in transporting the tape. During a recording or playback operation, either the nip between the capstan (not shown) at capstan opening 43 and pressure roll 49 or the nip between the capstan (not shown) at capstan opening 45 and pressure roll 51 drives the tape at a predetermined speed at which time there is relatively no slippage or sliding movement between the tape and the peripheral surface of the driving capstan and its pinch roller. However, when the supply reel 13 or take-up reel 15 becomes empty, as illustrated in FIG. 1, the movement of the tape stops and the reinforced tape end is tensioned. The capstan and pinch roller drive will continue to attempt to feed the tape forwardly for a short period of time until the tape drive mechanism turning the capstan is disabled. During this time there is a possibility of wear which would eventually lead to breakage. Heretofore, it has been thought necessary to use a 1½ mil thick leader for the capstan to rub against, when a reel empties, as the ½ mil thick magnetic tape is not sufficiently strong to withstand the wear of rubbing and the tensile forces encountered over long periods and large numbers of operations, particularly if iron oxide is present as it tends to act as a grinding compound on the base material of the magnetic tape. With the present invention, the reinforcing strips 19 may be as thick as one mil so that the cummulative thickness of the magnetic tape 17 and the reinforcing strip may so be about 1½ mil. The thickness of the reinforcing strip 19 may be thicker or thinner than one mil so long as it provides the requisite mechanical strength needed to resist tensile forces, elongation and abrasion consonant with the thickness which may be moved through the nip of the capstan and across the sound transducer head (not shown). As an alternative to the narrow backing strip 19 having a width slightly less than the magnetic tape, the backing strip 19 may have a width the same as or greater than the width of the tape. The illustrated backing strip 19 is slightly less in width between its longitudinally extending edges 53 and 55 than the width of the magnetic tape between its longitudinally extending edges 57 and 59.

The length of the reinforcing strip 19 may be varied but preferably it is sufficient to extend from its attached reel, such as reel 13, to at least a capstan opening 43 or 45. Preferably, the strip 19 extends from its attached reel, past a first rotatably guide roller 61, across the front cassette wall 25, about a second guide roller 63 to the opposite outer convolution of the coil on the other reel and then one or more wraps or convolutions about the coil. By way of example only, the illustrated reinforcing strip 19 is approximately 15 inches in length.

Figure 3:
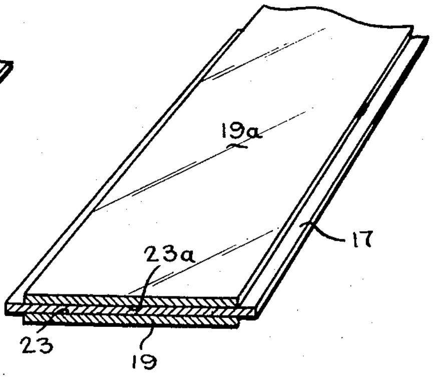
FIG. 3 is a view similar to FIG. 2 with reinforcing strips applied to both sides of the magnetic tape for connection to a reel.

In another embodiment of the invention, which is illustrated in FIG. 3, a second backing or reinforcing strip 19*a* identical to above described reinforcing strip 19 is adhered by an adhesive coating 23*a* to the other face of the magnetic tape to reinforce the magnetic tape at the ends thereof which are connected to the respective reels.

From the foregoing it will be seen that there has been disclosed an improved method of attaching the magnetic tape to reels for a tape cassette. The preferred method eliminates the tedious and manual fastening of the leader and then splicing of the tape and the leader together by splicing tape. The elimination of the leader and its assembly provides for improved reduction of manufacturing cost.

While a preferred embodiment has been shown and described, it will be understood that there is no intent to limit the invention by such disclosure, but, rather, it is intended to cover all modifications and alternate constructions falling within the spirit and scope of the invention as defined in the appended claims.

What is claimed is:

1. In a tape cassette, a plastic housing, a supply reel disposed within said housing for winding a coil of tape thereon, a take-up reel mounted in spaced relation to the supply reel in said housing for winding the tape thereon fed from said supply reel, said supply and take-up reels being rotatably mounted in said housing and having a fixed relationship to said housing, a magnetic tape for transport back and forth between said reels and for coiling and uncoiling on said reels, tape guides in said housing for guiding the magnetic tape past openings on a wall of the housing to admit a transducer head, at least one elongated reinforcing strip bonded to and along a length of each end portion of said magnetic tape, one reinforced end of said magnetic tape extending to said supply reel and the other reinforced end of said magnetic tape extending to said take-up reel, means in said housing defining an opening to receive a rotatable capstan, and means on said respective supply and take-up reels to anchor the respective reinforced tape ends to their respectively associated reels, each of said reinforced ends being of sufficient length to extend from its associated reel when empty past said tape guides, said transducer head, and said capstan receiving opening to the other reel to reinforce the tape against tension forces and against breaking due to rubbing and wear by a capstan.

2. A tape cassette in accordance with claim 1 in which each of said reinforced ends when extending from its associated empty reel is coiled about the other reel, each of said reinforcing ends being substantially unapertured, and in which a pressure sensitive adhesive coating is coextensive with each of said strips for adhering the reinforcing strips to the magnetic tape.

* * * * *